United States Patent [19]

Labudde et al.

[11] Patent Number: 5,776,025
[45] Date of Patent: Jul. 7, 1998

[54] ADJUSTABLE SELF-ALIGNING BELT TENSIONER

[75] Inventors: Brian R. Labudde; Alex B. Vayntrub, both of Rochester, N.Y.

[73] Assignee: Eastman Kodak Company, Rochester, N.Y.

[21] Appl. No.: 719,940

[22] Filed: Sep. 25, 1996

[51] Int. Cl.$^6$ .................................................. F16H 7/12
[52] U.S. Cl. ............................ 474/135; 474/133; 474/134
[58] Field of Search ................................ 474/135, 133, 474/137, 138

[56] References Cited

U.S. PATENT DOCUMENTS

| | | | |
|---|---|---|---|
| 959,667 | 5/1910 | White | 474/135 X |
| 1,577,103 | 3/1926 | Brown | 474/133 |
| 2,193,936 | 3/1940 | Ostand et al. | 474/137 X |
| 3,402,617 | 9/1968 | Fox | 474/135 |
| 4,454,236 | 6/1984 | Foster et al. | 474/135 |
| 4,605,387 | 8/1986 | Okubo et al. | 474/133 X |
| 4,957,471 | 9/1990 | St. John | 474/133 |
| 5,315,459 | 5/1994 | Kimura | 360/85 |
| 5,448,431 | 9/1995 | Kobayashi | 360/85 |
| 5,470,279 | 11/1995 | Brandenstein et al. | 474/135 |

FOREIGN PATENT DOCUMENTS

| | | | |
|---|---|---|---|
| 727744 | 6/1932 | France | 474/137 |
| 1305428 | 9/1961 | France | 474/135 |
| 228153 | 11/1910 | Germany | 474/133 |

OTHER PUBLICATIONS

Cimijotti et al. Drive Belt Tightener, IBM Technical Disclosure Bulletin, p. 3261, Mar. 1973.

*Primary Examiner*—Donald P. Walsh
*Assistant Examiner*—Emmanuel M. Marcelo
*Attorney, Agent, or Firm*—Lawrence P. Kessler

[57] ABSTRACT

An adjustable self-aligning tensioner, for a drive belt, the belt tensioner being self-aligning and readily adjustable. Such belt tensioner includes a pair of idler pulleys and a support for the pair of idler pulleys. A mount rotatably carries the idler pulley support. The mount is adjustably positioned relative to the drive belt, whereby the support carried by the mount locates the idler pulleys so as to be respectively engageable with the drive belt on opposite sides thereof. A mechanism reactive with the support and the mount urges the idler pulleys into engagement with the drive belt with a force so as to provide an adjustable preselected tension on the drive belt.

6 Claims, 2 Drawing Sheets

ADJUSTABLE SELF-ALIGNING BELT TENSIONER

BACKGROUND OF THE INVENTION

The present invention relates in general to belt tensioning devices, and more particularly to an adjustable belt tensioner which is self-aligning.

In complex mechanical devices, it is common practice to drive a plurality of components from a single motor. Such individual components may respectively have appropriately sized pulleys or gears, which are interconnected by a drive belt or chain. The drive belt usually follows a serpentine path so as to be operatively associated with the various pulleys. It is of critical importance for the proper functioning of the drive belt to maintain the drive belt under the proper amount of tension. That is, the tension must be sufficient to provide positive drive engagement between the drive belt and all of the pulleys, yet not be so great as to cause binding of any one of the pulleys.

Typically, drive belts may, over time, stretch or elongate during normal usage. As such, a drive belt may lose the ability to effect proper drive, or may become so loose as to jump the pulleys and become derailed. Accordingly, it is necessary to provide some mechanism which will compensate for loss of tension due to such belt elongation. At the same time, it is necessary to have the selective ability to readily relieve tension in the drive belt, such as for example for removing the drive belt for service or replacement. While many different belt tensioners have been provided in the prior art, they are generally of a complex construction and are either not readily adjustable or are hard to position during tension relief so as to be out of the way for drive belt removal.

SUMMARY OF THE INVENTION

In view of the foregoing discussion, this invention is directed to a belt tensioner which is self-aligning and readily adjustable. Such belt tensioner includes a pair of idler pulleys and a support for the pair of idler pulleys. A mount rotatably carries the idler pulley support. The mount is adjustably positioned relative to the drive belt, whereby the support carried by the mount locates the idler pulleys so as to be respectively engageable with the drive belt on opposite sides thereof. A mechanism reactive with the support and the mount urges the idler pulleys into engagement with the drive belt with a force so as to provide an adjustable preselected tension on the drive belt.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
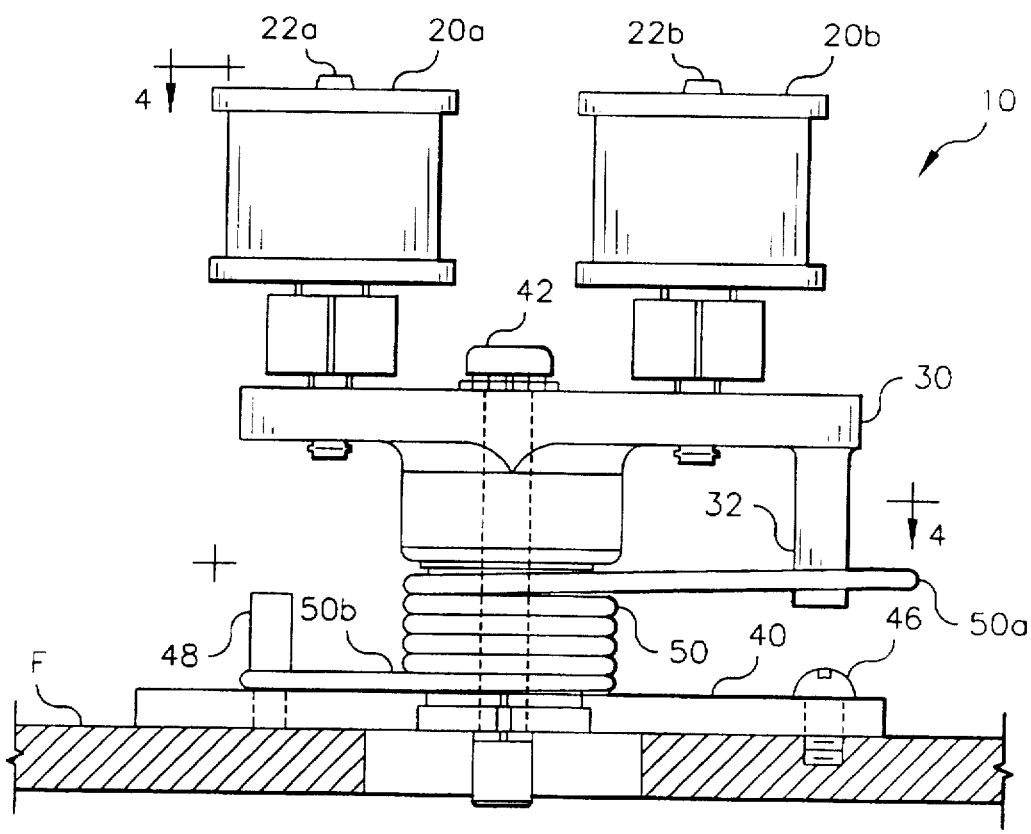
FIG. 1 is side elevational view of the adjustable self-aligning belt tensioner according to this invention.
Figure 2:
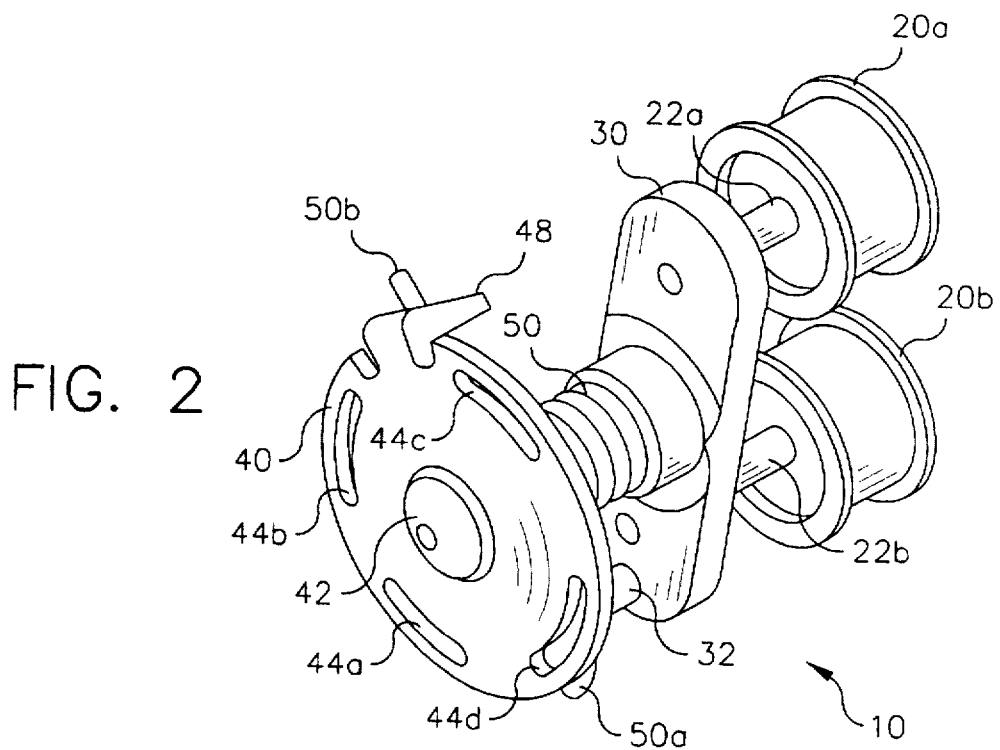
FIG. 2 is view, in perspective, of the adjustable self-aligning belt tensioner as shown in FIG. 1.

Referring now to FIGS. 1 and 2 of the accompanying drawings, an adjustable self-aligning belt tensioner, according to this invention, is shown and generally designated by the numeral 10. The adjustable self-aligning belt tensioner 10 is operatively associated with a chain or drive belt 12 (see FIGS. 3 and 4) for any particular mechanical device in which a plurality of individual components are driven by a single motor (not shown). As noted above, the purpose of the self-aligning belt tensioner 10 according to this invention is to maintain a desired tension on the drive belt and to enable ready adjustment of such tension.

The drive belt 12 is depicted as having a closed loop path about a plurality of gears or pulleys $14a-14f$. The pulleys $14a-14f$ respectively have predetermined diameters and wrap angles (and drive directions) with respect to the drive belt 12. As such, a single motor will transport the drive belt about the closed loop path so as to drive the related components at proper speeds and in appropriate directions for the desired overall operation of the mechanical device. Of course, other suitable drive belt arrangements, such as for example a belt traveling in a non-closed loop path, may also utilize the adjustable self-aligning belt tensioner 10 according to this invention.

The drive belt tensioner 10 includes a pair of idler pulleys 20a, 20b. The idler pulleys are selected, as to diameter and external configuration, so as to properly constrain and self-align with the particular drive belt 12 when engaged with such drive belt. The idler pulleys 20a, 20b, are mounted for free relative rotation on shafts 22a, 22b, respectively. The shafts 22a, 22b, are carried by a support 30 for the pair of idler pulleys 20a, 20b.

The support 30 is, in turn, carried by a mount 40. The mount 40 includes an elongated shaft 42 extending outwardly therefrom. The support 30 is mounted on the shaft 42 so as to be freely rotatable with respect thereto. In mounting of the support 30 on the shaft 42, the longitudinal axis of the shaft is located so as to intersect a line drawn between the longitudinal axes of the idler pulleys 20a, 20b, in the plane of the support, at an equal distance from the axis of each of the idler pulleys.

The mount 40 is supported, for example on the frame F of the mechanical device, at a location whereby it is positioned relative to the drive belt 12 so that the support 30 locates the idler pulleys 20 so as to be respectively engageable with the drive belt 12 on opposite sides thereof. Arcuate slots $44a-44d$ are provided in the mount 40 to accommodate suitable fasteners, such as set screws 46. The set screws 46 hold the mount 40 in a preselected support location. The respective arcs defined by the slots are of equal radii, with the center of the arcs being coincident with the longitudinal axis of the shaft 42. Accordingly, the mount 40 is adjustably positioned about the axis of the shaft 42 for the purpose explained more fully below.

A mechanism, such as a coiled torsion spring 50, is positioned about the shaft 42. The coiled torsion spring 50 is reactive with the support 30 and the mount 40 to urge the idler pulleys 20 into engagement with the drive belt 12 with a force so as to provide an predetermined tension in the drive belt. In order to furnish the reactive action, the mount 40 has a member 48 extending outwardly in the direction of the support 30, and the support 30 has a member 32 extending outwardly in the direction of the mount 40. The coiled torsion spring 50 has one elongated end 50a adapted to be operatively associated with the member 32 of the support 30, and an opposite elongated end 50b adapted to be associated with the member 48 of the mount 40.

With the described arrangement, the coiled torsion spring 50 will interact with the support 30 and the mount 40, through the association of the elongated ends 50a and 50b with the members 32 and 48 respectively, to urge the support for rotation relative to the mount about the longitudinal axis of the shaft 42. Since the idler pulleys 20a, 20b, carried by the support 30, are located to engage opposite sides of the drive belt 12, under the rotational urging of the coiled torsion spring 50, the idler pulleys will be moved in a direction (clockwise in FIGS. 3 and 4) to establish a predetermined tension on the drive belt. It should be noted that by utilizing two idler pulleys adapted to engage opposite sides of the drive belt, the force of the coiled torsion spring is distributed substantially equally to both sides of the drive belt. As such, wear on the drive belt caused by interaction with the idler pulleys is substantially reduced.

The action of the coiled torsion spring 50 on the members 32 and 48 of the support 30 and mount 40 respectively serves to maintain the tension on the drive belt 12 during normal operation of the mechanical device. Even if the drive belt stretches over time, the appropriate tension is maintained by the coiled torsion spring which acts in its normal fashion to urge the idler pulleys in respective directions to compensate for any such drive belt stretch. Further, as the drive belt stretches, and the idler pulleys 20a, 20b are urged by the coiled torsion spring 50 in the compensating direction, the wrap angle of the drive belt about the respective idler pulleys increases. This increase in wrap angle aides in maintaining the alignment of the idler pulleys with the drive belt, and provides additional stability in the engagement of the drive belt with the idler pulleys.

Adjustment of the tension on the drive belt 12 is readily accomplished by merely changing the angular orientation of the mount 40. As explained above, the location of the mount 40 is determined by positioning the mount, about the longitudinal axis of the shaft 42, and setting the set screws 46 to hold the mount in the set location. When the set screws are released, the mount can have its angular orientation changed by rotation of the mount (about the longitudinal axis of the shaft 42) whereby the arcuate slots 44a–44d will precess about the set screws 46. Resetting of the set screws will then hold the mount 40 in the new desired position.

Figure 4:
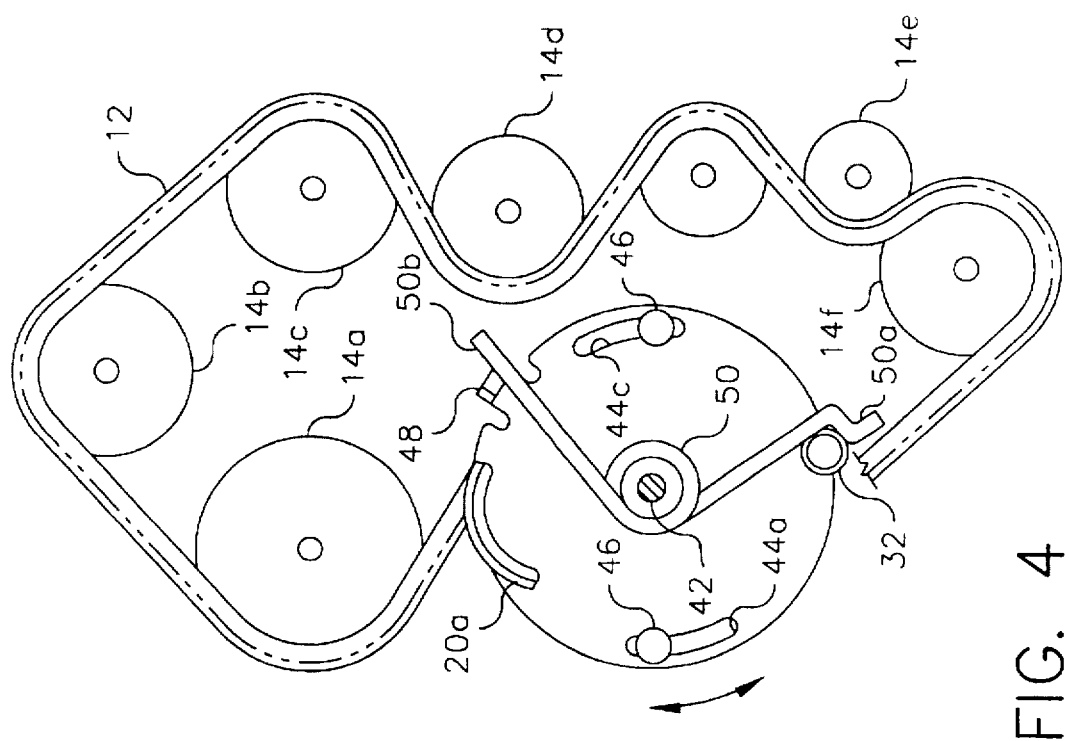
FIG. 4 is a front elevational view, similar to that of FIG. 3, of the adjustable self-aligning belt tensioner taken along the lines 4—4 of FIG. 1, with portions removed or broken away to facilitate viewing.
Figure 3:
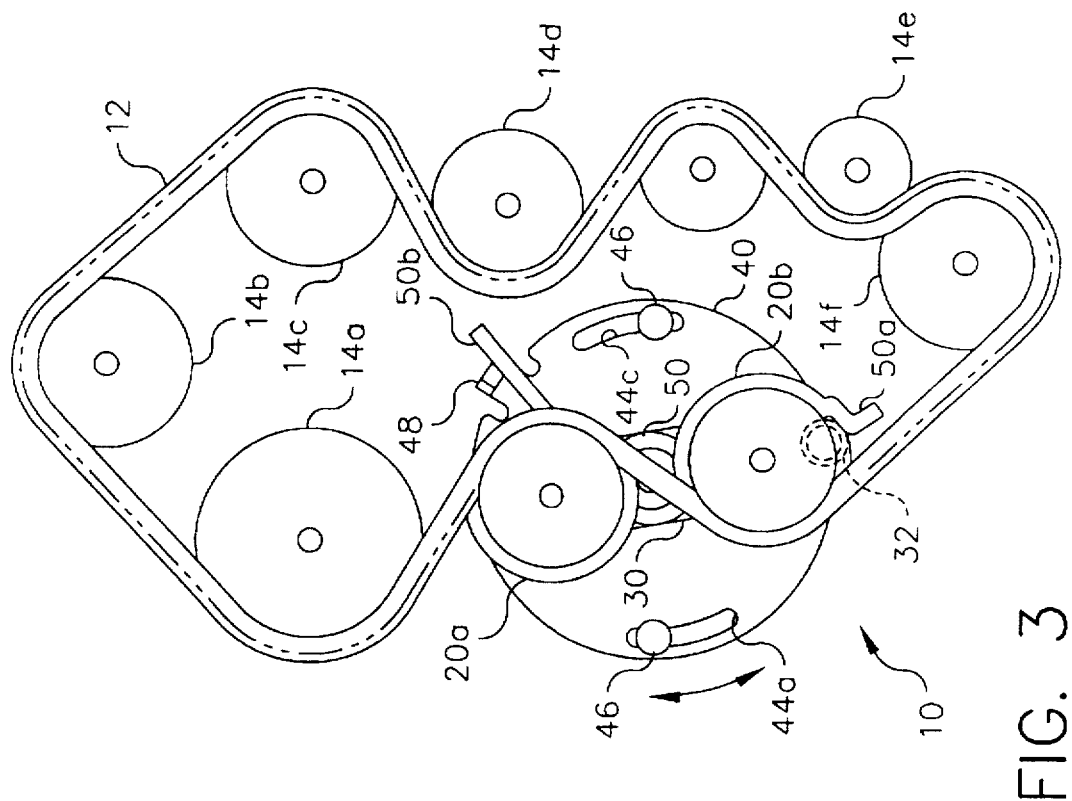
FIG. 3 is a front elevational view of the adjustable self-aligning belt tensioner as shown in FIG. 1.

As is apparent from the FIGS. 3 and 4, clockwise movement of the mount will provide for an increase adjustment for the tension on the drive belt, while counterclockwise movement of the mount will provide for a decrease adjustment for the tension on the drive belt. Of course, sufficient counterclockwise movement of the mount 40 will enable the idler pulleys 20a, 20b to be disengaged from the drive belt 12 so that the drive belt may be readily removed or replaced.

The invention has been described in detail with particular reference to preferred embodiment thereof, but it will be understood that variations and modifications can be effected within the spirit and scope of the invention as set forth in the claims.

What is claimed is:

1. An adjustable self-aligning tensioner for a drive belt, said tensioner comprising:

a pair of idler pulleys;

a support for said pair of idler pulleys;

a mount, said support being rotatably carried by said mount;

a plurality of slots defined in said mount and a plurality of fasteners associated with said plurality of slots respectively, wherein said fasteners enable said mount to move relative to said fasteners for angular adjustment of said mount location relative to said support whereby said support carried by said mount locates said idler pulleys so as to be adapted to be respectively engageable with a drive belt on opposite sides thereof; and urging means reactive with said support and said mount to urge said idler pulleys into engagement with the drive belt with a force so as to provide an adjustable preselected tension on such drive belt.

2. The adjustable self-aligning tensioner according to claim 1 wherein said urging means includes a torsion spring, said torsion spring having a first elongated end, and said support has a member adapted to be operatively associated with said first elongated end, and said torsion spring having a second elongated end, and said mount has a member adapted to be operatively associated with said second elongated end.

3. The adjustable self-aligning tensioner according to claim 1 wherein said slots are of arcuate configuration and are located about an axis coincident with an axis through the center of a line drawn between the respective axes of said idler pulleys, whereby said mount is rotatable about said axis through the center of a line drawn between the respective axes of said idler pulleys.

4. An adjustable self-aligning tensioner for a drive belt, said tensioner comprising:

a mount, said mount having a plurality of slots defined therein, said slots being arcuate segments located along a circular path with the center of said path being coincident with a longitudinal axis of said mount;

an elongated shaft extending from said mount, said elongated shaft having its longitudinal axis coincident with said longitudinal axis of said mount;

a support, rotatably carried by said mount, on said shaft, for relative rotation with respect to said mount;

a pair of idler pulleys carried on said support, the respective longitudinal axes of said idler pulleys being spaced equidistant from said elongated shaft;

fasteners associated with said mount through said slots for positioning said mount relative to a drive belt, whereby said support carried by said mount locates said idler pulleys so as to be respectively engageable with the drive belt on opposite sides thereof; and a spring reactive with said support and said mount respectively to urge said support about said longitudinal axis of said shaft relative to said mount to move said idler pulleys into engagement with said drive belt with a force so as to provide an adjustable preselected tension on such drive belt.

5. The adjustable self-aligning tensioner according to claim 4 wherein said spring is a torsion spring having a first elongated end and an opposite second elongated end, and wherein said support has a member adapted to be operatively associated with said first elongated end, and said mount has a member adapted to be operatively associated with said second elongated end.

6. The adjustable self-aligning tensioner according to claim 5 wherein said slots are located about an axis coincident with an axis through the center of a line drawn between the respective axes of said idler pulleys, whereby said mount is rotatable about said axis through the center of a line drawn between the respective axes of said idler pulleys.

\* \* \* \* \*